Patented Mar. 14, 1950

2,500,173

UNITED STATES PATENT OFFICE 2,500,173

EXTRACTION OF DIGITALIS GLYCOSIDES

Ole Gisvold, Minneapolis, Minn., assignor to Regents of the University of Minnesota, Minneapolis, Minn., a corporation of Minnesota No Drawing. Application January 2, 1947,
Serial No. 719,931

12 Claims. (Cl. 260—210)

The present invention relates to a process of extracting the active glycosides of digitalis from plant materials containing the same.

Heretofore, the commonest method of preparing digitalis involved the extraction of the plant material with an organic solvent, usually alcohol although other organic solvents may be used. In this extraction the active glycosides of digitalis are removed, but it is found that various coloring matters, sugars, gums and the like, which are undesirable, are also extracted and render the extract exceedingly discolored and subject to further discoloration with age.

It has now been discovered that it is possible to extract plant material containing digitalis glycosides in a novel manner which overcomes these various objections to the previously described method.

It is therefore an object of the present invention to provide a novel process of extracting digitalis glycosides.

In accordance with the present invention the plant material containing digitalis glycosides, such as plants either in the form of fresh and still moist leaves and other plant parts, or in the form of leaves preserved by fast freezing methods, is mixed with water and subjected to thorough disintegration capable of rupturing of all or nearly all of the plant cells. This disintegration may be accomplished by means of a disintegrating device such as the Waring blendor, where relatively small batches are handled or a Reitz disintegrator, type RD-18 where large batches are handled. The disintegration permits the water in which the plant material is suspended while being disintegrated to reach the digitalis glycosides contained in the plant cells, and the digitalis glycosides being water soluble are transferred to the aqueous medium which is then separated from the aqueous mass of disintegrated plant material by filtration or centrifuging. However, chlorophyll and other materials, which are undesirable so far as the digitalis preparation is concerned, also find their way into the aqueous medium. It has been discovered that these undesirable constituents can be removed without harmful effect by heating the separated aqueous liquor to a temperature in the range of 60° C. to 80° C., preferably about 60° C. for a short period of time. Usually it is sufficient just to bring the aqueous liquor up to temperature. The heating facilitates coagulation and precipitation of the chlorophyll and other undesirable constituents and seems to inactivate enzymes. Thereafter, the coagulated chlorophyll and other material which has been rendered insoluble may be removed by filtration for example through filter paper or a muslin pad with or without the addition of a filter aid. The insoluble undesirable constituents can also be removed by centrifuging. As a result of this filtration or centrifuging there results a light amber colored aqueous solution containing practically all of the active glycosides (digitalis) originally present in the leaf.

If desired, an aqueous alcoholic solution or an alcoholic solution may be prepared from the aqueous solution in the following manner: The aqueous solution may be first concentrated under vacuum with the aid of suitable non-foaming agents such as butyl alcohol. Alcohol may then be added to this concentrated aqueous solution to produce an alcoholic solution of the desired concentration. Some of the dissolved material may precipitate as a result of the addition of the alcohol and this precipitated material may be removed by filtration or centrifuging.

Where a straight alcoholic solution is desired, it may be prepared from the clarified aqueous solution by vacuum drying the aqueous solution and digesting the residue with alcohol. This alcoholic solution is pale yellow in color and may be separated from insoluble materials in the residue by filtration or centrifuging. The preparation of the alcoholic solution is facilitated by the addition of filter aid to the aqueous solution prior to the complete removal of the water. The resulting residue is much more easily dispersed and insures a more complete and rapid solution of the active constituents in the alcohol.

The following examples will serve to illustrate the invention:

Example I

Fifty (50) grams of fresh digitalis purpurea leaves were disintegrated for 10 minutes in 100 cc. of distilled water by means of a Waring blendor. The resulting mixture was warmed to 70° C. in order to precipitate the chlorophyll present. This mixture was then filtered through muslin on a Buchner funnel with the application of vacuum, and the residue washed with several 15 cc. portions of water. The combined filtrates then filtered readily through filter paper to remove substances which had passed through the muslin filter. This aqueous solution was amber colored and was assayed biologically by the one-hour frog method and the results of the assay indicated that complete extraction of the active digitalis glycosides had been obtained.

This aqueous extraction was converted to an alcoholic solution as follows: Water was removed from the extract by distillation under vacuum. A small amount of butyl alcohol was added as an anti-foaming agent during this operation. Before the extract was completely dried, 5 to 10 grams of filter cell (Johns-Manville) was added to facilitate subsequent dispersion of the solid residue. This prevents the formation of a gummy residue which is difficult to extract with alcohol.

A tincture or alcoholic solution was prepared from the preceding residue by extracting the residue with three 25 cc. portions of warm (60-80° C.) of 95% ethyl alcohol. These alcoholic extracts were combined, filtered and the resulting volume brought to 100 cc. with water. This solution was pale yellow in color and contained some reducing sugars but was free from high molecular weight polysaccharides and proteins. Biological assay with frogs showed that all the digitalis glycosides originally present in the aqueous solution had been transferred completely to the alcoholic solution.

Example II

Seventeen (17) grams of fresh digitalis lanata leaves were disintegrated for 10 minutes in 100 cc. of distilled water by means of a Waring blendor. The resulting mixture was warmed to 70° C. in order to precipitate the cholorophyll present. This mixture was then filtered through muslin on a Buchner funnel with the application of vacuum, and the residue washed with several 15 cc. portions of water. The combined filtrates then filtered readily through filter paper to remove substances which had passed through the muslin filter. This aqueous solution was amber colored and was assayed biologically by the one-hour frog method and the results of the assay indicated that complete extraction of the active digitalis glycosides had been obtained.

The reducing sugars were removed from this aqueous extract as follows: The aqueous extract was concentrated under vacuum to one-half to one-third its original volume. 5 to 10 grams of Johns-Manville filter cell were then added to the concentrated aqueous extract and sufficient solid sodium sulfate was added to saturate the solution. The addition of sodium sulfate precipitated the digitalis glycosides, together with some flavone pigments, polysaccharides and the like. This produced what is herein designated as a "precipitated mixture."

The filter cell is desirable, though not essential, because it served to disperse the precipitated substances and facilitated filtration and at the same time facilitated subsequent extraction. In the absence of the filter cell the precipitate is gummy and is more difficult to filter.

The precipitated mixture was washed free of water soluble sugars with a saturated solution of sodium sulfate, and an alcoholic solution was prepared therefrom, as in Example I, by extracting the precipitated mixture with three 25 cc. portions of warm (60-80° C.) 95% ethyl alcohol. These alcoholic extracts were combined, filtered and the resulting volume brought up to 100 cc. with water. The resultant tincture was free from reducing sugars and high molecular weight polysaccharides but still contained small amounts of yellow pigment. It contained all of the digitalis glycosides that were originally present in the aqueous solution, as evidenced by biological assays using frogs.

Example III

This example illustrates how the pigments can be removed substantially completely. A precipitated mixture of digitalis glycosides, flavone pigments, polysaccharides, etc. was prepared as described above in Example II. This precipitate was then placed in an adsorption column over a ¼" layer of magnesium oxide. 25 to 50 cc. of tetrahydrofuran were then poured into the column and completely extracted the active glycosides. The pigment dissolved by the solvent was adsorbed on the magnesium oxide layer to leave a substantially colorless solution. The tetrahydrofuran was then removed by vacuum distallation to leave a colorless residue which was substantially pure glycosides. If desired, this colorless residue can be used as a starting material for the preparation of crystalline digitalis glycosides in accordance with customary procedures. It may likewise be used for the preparation of a colorless tincture by simply dissolving the residue in alcohol for example 70% ethyl alcohol. Biological assay indicates that the digitalis glycosides are transferred substantially completely from the original leaves to the ultimate crystalline colorless residue of the alcohol extract, or colorless tincture prepared therefrom.

While in the previous examples for easy operation the leaves have been comminuted directly in the presence of water, it is evident that this is not essential to the success of the process. The leaves may be separately comminuted and may be subsequently extracted with water to produce the preliminary extract.

Variations in the foregoing generally defined and exemplified procedures may be made within the scope of the claimed invention. For instance, in Example II any neutral alkali metal salt can be used in place of the sodium sulfate. Thus, sodium and potassium chlorides and potassium sulfate are suitable for this purpose. Likewise, other solvents may be used for the removal of the pigment in Example III. In general such solvents include the cyclic ethers containing 5 and 6 membered rings. Suitable exemplary solvents in this class are furan, dihydrofuran, pyran, dihydropyran, tetrahydropyran and dioxane. Similarly, it will be apparent that numerous adsorbents may be used to remove the color in the adsorption column. The usual adsorbents such as magnesium oxide, aluminum oxide, sodium aluminate, sodium or potassium carbonates and the like are useful for this purpose.

While various modifications of the invention have been described, it is to be understood that the invention is not limited thereto but may be varied within the scope of the following claims.

What I claim is:

1. The process of preparing an aqueous digitalis extract which comprises comminuting plant material containing digitalis and selected from the group consisting of fresh, moist plant material and such material preserved by quick freezing until at least most of the plant cells containing the digitalis glycosides are ruptured, extracting the disintegrated plant material with water, separating from the insoluble material the aqueous solution of digitalis glycosides which also contains chlorophyll and other undesirable materials which are thus also extracted from the residue of the plant material, heating the thus separated aqueous solution to a temperature in the range of 60° C. to 80° C. until coagulation of materials appears therein and separating the remaining aqueous liquor containing digitalis glycosides.

2. The process of claim 1 further characterized in that the plant material is disintegrated while suspended in the water by which the plant material is extracted.

3. The process of preparing a digitalis extract which comprises comminuting plant leaves containing digitalis and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll.

4. The process of preparing a digitalis extract which comprises comminuting in the presence of water plant leaves containing digitalis glycosides and selected from the group consisting of fresh, moist leaves and leaves preserved by quick freezing to produce a preliminary aqueous extract, heating the preliminary extract to about 60° C. to coagulate the chlorophyll and other undesired constituents, separating insoluble material from the crude extract to produce a light colored aqueous extract substantially free of chlorophyll.

5. The process of producing an aqueous alcoholic extract of digitalis which comprises comminuting plant leaves containing digitalis glycosides and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll, concentrating the aqueous extract under vacuum, mixing alcohol therewith and separating any material precipitated thereby.

6. The process of producing an alcoholic extract of digitalis which comprises comminuting plant leaves containing digitalis glycosides and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll, evaporating the aqueous extract to dryness under vacuum, extracting the residue with alcohol and separating any insoluble residue from the alcoholic extract.

7. The process of producing an alcoholic extract of digitalis which comprises comminuting plant leaves containing digitalis glycosides and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll, adding a filter aid to the aqueous extract, evaporating the resultant mixture to dryness under vacuum, extracting the residue with alcohol and separating any insoluble material from the alcoholic extract.

8. The process of producing an alcoholic extract of digitalis which comprises comminuting plant leaves containing digitalis glycosides and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll, concentrating the aqueous extract, precipitating glycosides therefrom by the addition of a neutral alkali metal salt and separating the precipitated glycosides from the aqueous extract.

9. The process of producing an alcoholic extract of digitalis which comprises comminuting plant leaves containing digitalis glycosides and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll, concentrating the aqueous extract, precipitating glycosides therefrom by the addition of solid sodium sulfate and separating the precipitated glycosides from the aqueous extract.

10. The process of producing an alcoholic extract of digitalis which comprises comminuting plant leaves containing digitalis glycosides and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll, concentrating the aqueous extract, adding a filter aid thereto, precipitating the glycosides therefrom by the addition of a neutral alkali metal salt and separating the precipitated glycosides from the aqueous extract.

11. The process of producing an alcoholic extract of digitalis which comprises comminuting plant leaves containing digitalis glycosides and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll, concentrating the aqueous extract, precipitating glycosides therefrom by the addition of a neutral alkali metal salt and separating the precipitated glycosides from the aqueous extract, washing the precipitate with a saturated solution of a neutral alkali metal salt to remove soluble sugars therefrom, dissolving the washed residue in a cyclic ether containing a ring selected from the group consisting of pyran-, furan- and dioxane-rings, contacting the resultant solution with an adsorbent to remove pigments therefrom and removing the cyclic ether solvent to recover the digitalis glycosides in the form of a substantially colorless residue.

12. The process of producing an alcoholic extract of digitalis which comprises comminuting plant leaves containing digitalis glycosides and selected from the group consisting of fresh, moist leaves and leaves preserved by quick freezing, extracting the comminuted leaves with water to produce a preliminary aqueous extract, heating the preliminary extract to about 60° C. to coagulate the chlorophyll and other undesired constituents, separating insoluble material from the crude extract to produce a light colored aqueous extract substantially free of chlorophyll, concentrating the aqueous extract, precipitaing glycosides therefrom by the addition of solid sodium sulfate and separating the precipitated glycosides from the aqueous extract, washing the precipitate with a saturated solution of sodium sulfate to remove soluble sugars therefrom, dissolving the washed residue in tetrahydrofuran, passing the resultant solution through an adsorption column to remove pigments therefrom and removing the tetrahydrofuran from the solution to yield a substantially colorless residue of digitalis glycosides.

OLE GISVOLD.

REFERENCES CITED

The following references are of record in the file of this patent:

UNITED STATES PATENTS

| Number | Name | Date |
| --- | --- | --- |
| 2,068,027 | Jager | Jan. 19, 1937 |
| 2,224,804 | Wolf | Dec. 10, 1940 |
| 2,282,969 | King | May 12, 1942 |

OTHER REFERENCES

Strain, "Jour. Physical Chem.," 46:1151 to 1161 (1942).